(12) United States Patent
Zhang et al.

(10) Patent No.: US 9,831,726 B2
(45) Date of Patent: Nov. 28, 2017

(54) ELECTRICAL MACHINE (71) Applicant: Brose Fahrzeugteile GmbH & Co. KG, Wuerzburg, Wuerzburg (DE)

(72) Inventors: Sunny Zhang, Wuerzburg (DE); Jin Xu, Wuerzburg (DE); Daniel Fiederling, Wertheim (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 474 days.

(21) Appl. No.: 14/485,266

(22) Filed: Sep. 12, 2014

(65) Prior Publication Data

US 2014/0375160 A1 Dec. 25, 2014

Related U.S. Application Data (63) Continuation of application No. PCT/EP2012/004461, filed on Oct. 25, 2012.

(30) Foreign Application Priority Data

Mar. 13, 2012 (DE) .................. 10 2012 005 141

(51) Int. Cl.
*H02K 21/12* (2006.01)
*H02K 1/02* (2006.01)
(Continued)

(52) U.S. Cl.
CPC .............. *H02K 1/02* (2013.01); *H02K 1/06* (2013.01); *H02K 1/17* (2013.01); *H02K 1/27* (2013.01);
(Continued)

(58) Field of Classification Search
CPC ........ H02K 1/2766; H02K 1/278; H02K 1/02; H02K 1/276
(Continued)

(56) References Cited

U.S. PATENT DOCUMENTS

| 5,962,944 A | 10/1999 | Narita et al. |
| 6,847,143 B1 | 1/2005 | Akemakou |

(Continued)

FOREIGN PATENT DOCUMENTS

| CN | 1215942 A | 5/1999 |
| CN | 1375122 A | 10/2002 |

(Continued)

OTHER PUBLICATIONS

Japanese Office Action for Japanese Application No. 2014-561290 dated Jul. 5, 2016—English translation.
(Continued)

*Primary Examiner* — Thanh Lam
(74) *Attorney, Agent, or Firm* — Muncy, Geissler, Olds & Lowe, P.C.

(57) ABSTRACT

An electrical machine, in particular an electric motor of a motor vehicle, having a stator and having a rotor which has a rotation axis. In this case, an electrical machine can be a brushless electric motor (DC motor) or a synchronous machine, but also a generator. The stator or the rotor has an electromagnet structure and the other has a permanent-magnet structure which comprises a first quantity of permanent magnets and a second quantity of permanent magnets. At an operating temperature, the magnetic coercive field strength of the first quantity is greater than the magnetic coercive field strength of the second quantity.

17 Claims, 5 Drawing Sheets

(51) Int. Cl.
    *H02K 21/16*     (2006.01)
    *H02K 1/27*     (2006.01)
    *H02K 1/06*     (2006.01)
    *H02K 1/17*     (2006.01)
    *H02K 3/46*     (2006.01)

(52) U.S. Cl.
    CPC ........... *H02K 1/276* (2013.01); *H02K 1/2766* (2013.01); *H02K 1/2773* (2013.01); *H02K 3/46* (2013.01); *H02K 21/16* (2013.01); *H02K 2201/03* (2013.01); *H02K 2213/03* (2013.01)

(58) Field of Classification Search
    USPC ........................................ 310/156.01–156.84
    See application file for complete search history.

(56) References Cited

U.S. PATENT DOCUMENTS

| | | | |
|---|---|---|---|
| 7,556,082 | B2 | 7/2009 | Welchko et al. |
| 8,269,390 | B2 | 9/2012 | Sakai et al. |
| 8,269,392 | B2 | 9/2012 | Doi et al. |
| 2005/0040721 | A1 | 2/2005 | Kusase et al. |
| 2007/0284960 | A1 | 12/2007 | Fulton et al. |
| 2008/0231132 | A1 | 9/2008 | Minowa et al. |
| 2010/0072850 | A1 | 3/2010 | Miyata et al. |
| 2010/0277017 | A1 | 11/2010 | Alexander et al. |
| 2010/0327689 | A1* | 12/2010 | Sakai .................. H02K 1/2766 310/156.03 |
| 2011/0315913 | A1 | 12/2011 | Shigeoka et al. |
| 2013/0127280 | A1 | 5/2013 | Sugimoto et al. |

FOREIGN PATENT DOCUMENTS

| | | |
|---|---|---|
| CN | 101047325 A | 10/2007 |
| CN | 101232205 A | 7/2008 |
| CN | 101485064 A | 7/2009 |
| CN | 101946386 A | 1/2011 |
| CN | 102044944 A | 5/2011 |
| CN | 102300655 A | 12/2011 |
| DE | 10 2007 015 839 A1 | 10/2008 |
| DE | 10 2009 000 028 A1 | 7/2010 |
| EP | 1 223 658 A1 | 7/2002 |
| EP | 2 246 961 A1 | 11/2010 |
| EP | 2 360 814 A1 | 8/2011 |
| JP | S 59-61008 A | 4/1984 |
| JP | S 60-219947 A | 11/1985 |
| JP | S 60-226749 A | 11/1985 |
| JP | H 08-340651 A | 12/1996 |
| JP | H 10-304610 A | 11/1998 |
| JP | 2002-540754 A | 11/2002 |
| JP | 2003-017309 A | 1/2003 |
| JP | 2006-115663 A | 4/2006 |
| JP | 2007-208104 A | 8/2007 |
| JP | 2009-027846 A | 2/2009 |
| JP | 2010-098863 A | 4/2010 |
| JP | 2010-130859 A | 6/2010 |
| JP | 2011-078270 A | 4/2011 |
| JP | 5398103 B2 | 1/2014 |
| WO | WO 01/22560 A1 | 3/2001 |
| WO | WO 2006/109615 A1 | 10/2006 |
| WO | WO 2007/146208 A1 | 12/2007 |
| WO | WO 2011/125209 A1 | 10/2011 |
| WO | WO2012/014260 A1 | 2/2012 |

OTHER PUBLICATIONS

Chinese Office Action for Chinese Application No. 201280071454.7 dated Apr. 29, 2016—English translation.
Chinese Office Action for Chinese Application No. 201380014358.3 dated Apr. 26, 2016—English translation.
Chinese Office Action for Chinese Application No. 201280071454.7 dated Dec. 30, 2016—English translation.
Japanese Office Action for Japanese Application No. 2014-561291 dated Aug. 30, 2016 with partial English translation.
Japanese Office Action for Japanese Application No. 2014-561291 dated Mar. 13, 2017 with partial English translation.
Japanese Office Action for Japanese Application No. 2014-561290 dated Mar. 17, 2017 with partial English translation.
Chinese Office Action for Chinese Application No. 201380014379.5 dated Sep. 28, 2016—English translation.

* cited by examiner

ELECTRICAL MACHINE

This nonprovisional application is a continuation of International Application No. PCT/EP2012/004461, which was filed on Oct. 25, 2012, and which claims priority to German Patent Application No. 10 2012 005 141.7, which was filed in Germany on Mar. 13, 2012, and which are both herein incorporated by reference.

BACKGROUND OF THE INVENTION

Field of the Invention

The invention relates to an electrical machine having a stator and having a rotor which has an axis of rotation. In this case, an electrical machine is understood to mean, in particular, a brushless electric motor (DC motor) or a synchronous machine, but a generator as well.

Description of the Background Art

In the automotive industry or in motor vehicles, electric motors (DC motors) are used in drives for various actuating elements, for example, as window lift, sunroof, or seat adjustment drives and/or as a steering wheel drive (electric power steering), as a cooling fan drive, or as a transmission actuator. Such electric motors have a relatively high torque or power density and should be reliable to operate particularly also at relatively high engine temperatures of, for example, up to at least 120° C.

In principle, brushed electric motors (commutator motors) and/or brushless electric motors, whose rotor, surrounded by a stator provided with a field winding, is equipped or provided with permanent magnets, are used in the automotive sector. Typically, both the rotor and stator are made as lamination stacks, whereby stator teeth with stator slots lying inbetween support the coils of the field winding. These are controlled by an (electronic) circuit in order to generate a rotating field which produces a torque on the permanently excited rotor.

Because both high operating temperatures and (external) magnetic fields, which are caused, for example, by current peaks induced in the stator-side field winding or coil, can lead to an undesirable end demagnetization of the rotor-side permanent magnet, magnet materials or alloys with as high a coercive field strength as possible are usually used. To achieve as a high coercive field strength as possible, therefore, as a rule alloys with components or amounts of rare earth elements are used. In this regard, both light rare earth elements (LREE), particularly samarium-cobalt or neodymium-iron-boron alloys, as well as terbium- or dysprosium-containing alloys are employed to increase the coercivity and to broaden the usable temperature range. In the meantime, however, the so-called heavy rare earth elements (HREE) such as, for example, terbium and particularly dysprosium, have become increasingly cost-intensive.

SUMMARY OF THE INVENTION

It is therefore an object of the invention to provide an especially suitable electrical machine, which can be produced especially at a relatively low price and advantageously has a relatively high demagnetization resistance.

In an embodiment, the electrical machine can be an electric motor, preferably a brushed DC motor, and comprises a stator and a rotor. The rotor is mounted rotatably around an axis of rotation with respect to the stator, whereby the rotor is disposed, for example, within the stator. Alternatively, the rotor surrounds the stator in the manner of an external rotor. The stator and rotor are suitably disposed within a housing, which protects both of these from possible damage and/or environmental effects.

Either the stator or the rotor has an electromagnet structure with at least one coil body, which is mounted in a specific position to the other of the two parts, therefore the rotor or stator. The coil body can have an enameled copper wire and is used to generate a time-varying magnetic field, if the electrical machine is an electric motor. This is provided by energization of the coil via the terminal ends. During use as a generator, an induced electrical voltage is tapped off at the coil body.

The stator or rotor that is free of the electromagnet structure comprises a permanent magnet structure. In other words, either the stator or rotor has the electromagnet structure and the other the permanent magnet structure. Especially preferably, the electromagnet structure is part of the stator and the permanent magnet structure is part of the rotor. The permanent magnet structure has a first set and a second set of permanent magnets, whereby the permanent magnets of the particular set are positioned at specific locations. Each set comprises at least one permanent magnet, the permanent magnets of the particular set being formed the same, for example. Preferably, the number of the permanent magnets in the two sets correspond to one another and is particularly the same, or, for example, the one number is an integer multiple of the other number.

The magnetic coercive field strength of the first set of permanent magnets is greater than the magnetic coercive field strength of the second set. In other words, the magnetic coercive field strength of each permanent magnet of the first set is greater than the magnetic coercive field strength of each permanent magnet of the second set, whereby preferably the magnetic coercive field strength of all permanent magnets in each set is the same. This property applies at least at the operating temperature of the electrical machine, whereby the operating temperature adjusts in particular after a specific operating time.

For example, the operating temperature is determined within the region of the permanent magnet structure, preferably for each permanent magnet of the permanent magnet structure. The maximum operating temperature in this case is between 80° C. and 120° C. For example, at temperatures below the operating temperature as well, the magnetic coercive field strength of the first set is greater than the magnetic coercive field strength of the second set.

The permanent magnets of the first set can be arranged at exposed locations where the occurrence of demagnetization is relatively pronounced due to relatively high operating temperatures, an (external) magnetic field or flux undesirable per se or to be avoided, or during the operation of the electromagnet structure. Because of the positioning of the permanent magnets of the first set, which are relatively resistant to this, a sufficient demagnetization resistance of the permanent magnet structure is assured. As a result, it is made possible to produce the permanent magnets of the second set from a relatively low-priced material, because these are not subjected to demagnetization to the same extent as the permanent magnets of the first set.

Suitably, all permanent magnets of the particular set can be produced from the same material and preferably have the same structure. For example, all permanent magnets of the particular set are produced in the same work step or cut from a block magnet, different blocks being used for the two sets. Alternatively, all permanent magnets of the permanent magnet structure are produced from the same material but in a different way, so that there is a difference in the coercive field strength.

Suitably, at at least the operating temperature the remanence of the second set is greater than the remanence of the first set. Consequently, the magnetic field generated per volume by the permanent magnets of the second set is stronger than that of the permanent magnets of the first set. Thus, it is made possible to realize a relatively strong magnetic field of the permanent magnet structure by means of the permanent magnets of the second set, whereby a possible demagnetization of the permanent magnet structure by the permanent magnets of the first set is prevented. In this way, the permanent magnets of both sets can be optimized for their specific intended use, whereby the other feature, therefore the magnetic coercive field strength or the remanence, is considered to a lesser extent. The permanent magnets of the permanent magnet structure thus need not fulfill both requirements, resulting in a saving of cost, whereby the electrical machine nevertheless meets a relatively high performance requirement.

In an embodiment of the invention, the distance of the part with the electromagnet structure of the electrical machine, therefore the stator or rotor, to the permanent magnets of the first set is smaller than the distance to the permanent magnets of the second set. Provided the electrical machine is an inner one with a permanently excited rotor, the permanent magnets of the first set are thus shifted radially outward in comparison with the permanent magnets of the second set. Due to such an arrangement, the second set is protected from demagnetization by the electromagnet structure during operation, whereby preferably one of these generated magnetic fields is directed by means of the magnets of the first set. The first set, in contrast, is located preferably relatively close to the electromagnet structure, so that the magnetic field generated by it interacts with the permanent magnet structure predominantly in the region of the first set.

One permanent magnet of the first set and one permanent magnet of the second set can be combined to form a hybrid magnet, which is arranged radially with respect to the axis of rotation. The permanent magnets, assigned to one another, of the first set and the second set thus lie particularly at least partially on a radial straight line. In this way, the permanent magnet of the second set is sufficiently protected from demagnetization by the electromagnet structure. Suitably, in this case, the number of the permanent magnets in each set is the same, whereby the number of the hybrid magnets corresponds particularly to this number. In other words, hybrid magnets are formed from all permanent magnets. Preferably, the number of the hybrid magnets is between 8 and 10.

The magnetization direction of the two permanent magnets of the, or each, hybrid magnet can be parallel to one another. Consequently, a magnetic field that promotes the demagnetization of the permanent magnet of the second set is not produced by the permanent magnet of the first set. Further, a demagnetization of the permanent magnet of the first set by the magnetic field of the permanent magnet of the second set is prevented or at least weakened. Moreover, when the electrical machine is turned off and thus when the electromagnet structure is not energized, the permanent magnet of the first set is again magnetized in its original magnetization direction by the permanent magnet of the second set, for which reason the lifetime of the electrical machine is increased.

This effect is intensified by direct mechanical contact of the two permanent magnets of the, or each, hybrid magnet. Moreover, with this type of arrangement of both permanent magnets, the installation space is reduced regardless of the magnetization direction, and it is made possible to produce the or each hybrid magnet even before mounting on the rotor or stator. In particular, the two permanent magnets are glued together for this purpose. In a parallel magnetization of the two permanent magnets, this can be omitted because these are connected together due to the mutually acting magnetic force.

For example, the cross section of the permanent magnets of the first and/or second set is rectangular with respect to the axis of rotation. Alternatively, the cross section is trapezoidal in particular. Expediently, in this case the shorter of the two edges of the trapezoid, which are parallel to one another, are shifted in the direction of the axis of rotation. A relatively large volume of magnetic material is provided in this way, whereby a relatively small diameter of the electrical machine can also be realized. Especially preferably, the cross section of the permanent magnet, forming the or each hybrid magnet, of the first set is rectangular and that of the permanent magnet of the second set trapezoidal. In this case, the two permanent magnets suitably lie flush against one another. In other words, the edge lengths facing one another correspond. Consequently, demagnetization of the permanent magnets of the second set is prevented, whereby the magnetic field produced by these interacts relatively strongly with that of the magnetic field produced by the electromagnet structure.

The permanent magnet structure can comprise at least two trapezoidal permanent magnets, which are assigned either to the first or second set. A number of permanent magnets of a third set is arranged between these. Preferably, the two numbers are the same, so that the permanent magnets of the third set and the first set or the second set alternate in the circumferential direction. For example, the permanent magnets of the third set are also trapezoidal. In particular, in this case all trapezoidal permanent magnets abut one another with their respective flanks facing one another, whereby the parallel edges of the trapezoids are tangential with respect to the axis of rotation.

The permanent magnets of the first set can be rectangular and cover the permanent magnets of the second set. Consequently, the magnets of the third set are not covered. In particular, the magnetization direction of the permanent magnets of the third set is different from the others. The magnetic field of the permanent magnet structure is suitably formed in this way by the permanent magnets of the third set. In particular, the magnetization direction is substantially radial. Consequently, this allows for the use of a material with a relatively low magnetic coercive field strength as the material of the third set, because a demagnetization due to the magnetic field, produced by the electromagnet structure, primarily affects tangentially magnetized permanent magnets. Further, another magnet material is provided by the third set, which increases the performance of the electrical machine.

The magnetic coercive field strength of the third set can be different from that of the first and/or second set. Alternatively or in combination, the remanence of the third set is different. Suitably, in this case, the remanence of the third set is greater than that of the first set and the magnetic coercive field strength is greater than that of the second set. This is realized, for example, by using heavy rare earth elements in the production of the permanent magnets of the third set. In fact, the material costs but also both the lifetime and performance of the electrical machine are increased in this way. In comparison with a production of the permanent magnet structure only from a heavy rare earth element alloy, however, the fabrication costs are reduced with approximately the same lifetime and performance.

Each hybrid magnet can be arranged in a pocket of a lamination stack. The course of the pocket in this case is preferably substantially parallel to the axis of rotation, and the laminations include a soft-magnetic material. Because of the use of individual laminations that are insulated from one another, for example, by means of an enamel layer, propagation of parasitic induction currents is suppressed, which would otherwise reduce the efficiency of the electrical machine. Further, the permanent magnets are protected from damage and/or environmental effects, which otherwise would lead to corrosion, for example. The assembly of the hybrid magnet is also facilitated, because it only needs to be inserted in the pocket of the lamination stack. In particular, in the case of mounting on a rotor, loosening of the hybrid magnet due to centrifugal forces during the operation of the electrical machine is prevented.

An embodiment of the invention provides that in each case a ring, hereinafter referred to as the first ring or second ring, whose center lies in particular on the rotor's axis of rotation, can be formed from the first and second set. In this regard, the rings are assembled either from component magnets into a ring form or cast from the material of the particular set, for example, sintered or molded. The distance of the first ring to the electromagnet structure is again smaller than that of the second ring. For example, the second ring surrounds the first ring, if the rotor formed as an inner rotor has the electromagnet structure. In the case of an outer rotor with the electromagnet structure, in contrast, the first ring would surround the second ring. Production of the electrical machine is simplified by the use of the two rings, because only two rings need to be mounted. Furthermore, an orientation of possible component magnets need not be considered, whereby nevertheless the magnetic field of the permanent magnet structure has the desired form.

In an embodiment, the first and second ring can be in direct mechanical contact with one another. In other words, the two rings abut each other, whereby advantageously one of the two rings surrounds the other circumferentially. The outer diameter of the inner ring thus is the same as the inner diameter of the outer ring. For example, the two rings are connected together by means of a form and/or force fit. The production is again simplified in this way, because the two rings can be produced as a unit before mounting on the rotor or stator. Consequently, only a single part needs to be attached to the rotor or stator.

An air gap formed between the rotor and stator can be bounded by the first ring. In other words, the first ring is the stator or rotor element nearest to the rotor or stator in the region of the first ring in the radial direction with respect to the axis of rotation. In this way, the distance between the permanent magnet structure and the electromagnet structure is relatively small, which reduces stray fields and increases the conduction of the electrical machine. In particular, the material of the first ring is relatively corrosion-resistant, whereas the material of the second ring need not absolutely satisfy this property to assure a relatively long lifetime of the electrical machine. Expediently, the material of the first ring is a ceramic.

For example, the permanent magnet structure comprises a third ring, which is formed from a third set whose remanence differs from the first and/or second set. For example, in addition the magnetic coercive field strength is different. Suitably, the remanence of the third set is greater than that of the first set and the magnetic coercive field strength is greater than that of the second set. In particular, the third set has heavy rare earth elements.

The third ring is arranged on the side of the second ring, opposite to the first ring. In particular, the second ring is surrounded on the interior and exterior in the radial direction by the first and third ring, whereby the rings expediently abut one another. In this way, the second ring is protected relatively effectively against demagnetization.

Advantageously, each of the rings has between 8 and 10 magnetic poles. For this purpose, each ring is exposed to an appropriate magnetic field either during the casting or after it, for example, after mounting in the electrical machine. When the electrical machine is used as an electric motor, therefore, a relatively constant torque band is assured and when it is used as a generator a relatively constant current flow are assured.

The rings in each case can have the same number of magnetic poles, which are arranged preferably in the radial direction to one another. In other words, the magnetic field in the region of the poles between the two rings is substantially constant and directed radially. In particular, in the case in which the rings abut each other directly, the production of the permanent magnet structure is simplified, because the rings adhere to one another via the mutual magnetic force.

The material of the first set can be a ferrite, which can be sintered. Alternatively, the material is, for example, sintered SmCo or NdFeB, (NdDy)FeB. It is also possible to cast the material, whereby preferably NdFeB, SmCo, or SmFeN is used. For example, the same materials as for the second set are used, whereby the type of composition and/or production is tailored to achieving the increased magnetic coercive field strength of the first set.

For example, the material is the same for the first and the second set, which prevents contact corrosion in a direct mechanical contact of the particular permanent magnets. Suitably, an alloy, which has light rare earth elements, is used as the material of the second set. These are distinguished particularly by a relatively high remanence, for which reason the performance of the electrical machine is increased. The associated low magnetic coercive field strength, in comparison with the use of heavy rare earth elements, is compensated by the use of the first set. Especially preferably, the second set includes NdFeB, which has a relatively great availability and high remanence.

In particular, the permanent magnet structure and suitably the entire electrical machine are free of heavy rare earth elements. It has at least no dysposium and/or terbium. In this way it becomes possible to produce the electrical machine relatively cost-effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3a shows a further embodiment of the electrical machine according to FIG. 2a;

FIG. 3c shows a further embodiment of a rotor of the electrical machine according to FIG. 2a; and FIG. 4 shows a last embodiment of the electrical machine according to FIG. 2a.

DETAILED DESCRIPTION

Figure 1A:
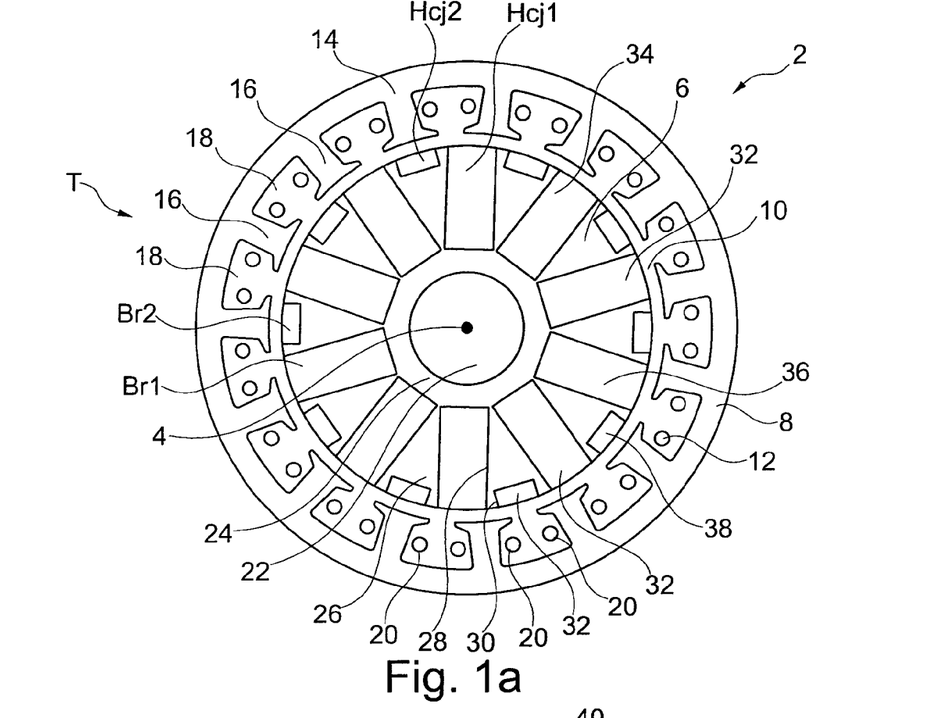
FIG. 1a shows in a sectional illustration an electrical machine with a first and a second set of permanent magnets.

A first embodiment of an electrical machine 2, designed as a synchronous machine and used as an electric motor, is shown in FIG. 1a. Electrical machine 2 is shown here in a sectional illustration perpendicular to an axis of rotation 4 of a rotor 6, which is surrounded by a stator 8, an air gap 10 being formed between these. Stator 8 comprises an electromagnet structure 12 with a soft-magnetic stator lamination stack 14, which has 15 teeth 16, each of which is separated by a slot 18 running parallel to axis of rotation 4. A coil 20, which is disposed in two adjacent slots 18, is looped around each tooth 16. Coils 20 are made of an enameled wire and are energized by means of electronics (not shown). Electric motor 2 therefore is brushless.

Rotor 6 has a shaft 22, which is enclosed by a substantially nonmagnetic core 24 with a regular decagon as a cross section. Core 24 is surrounded form-fittingly by a soft-magnetic lamination stack 26, which as a result has a relatively low magnetic coercive field strength. Ten first pockets 28 and 10 second pockets 30, which extend parallel to axis of rotation 4, are made in the lamination stack. A permanent magnet 32 of a permanent magnet structure 34 is disposed form-fittingly within pockets 28, 30, permanent magnets 32 being divided into a first set 36 and a second set 38. First set 36 is thereby assigned to first pockets 28 and second set 38 to second pockets 30. Permanent magnets 32 of first set 36 are made of a sintered ferrite and have a first magnetic coercive field strength $Hcj_1$ and a first remanence $Br_1$, which are the same for all permanent magnets 32 of first set 36.

Permanent magnets 32, including NdFeB, of second set 38 have a constant second magnetic coercive field strength $Hcj_2$ and a constant second remanence $Br_2$. In this case, permanent magnets 32 of second set 38 are made in such a way that second remanence $Br_2$ is maximal. This causes a relatively low second magnetic coercive field strength $Hcj_2$.

The situation is the opposite in permanent magnets 32 of first set 36, so that the first magnetic coercive field strength $Hcj_1$ is relatively high. At least at an operating temperature T of electrical machine 2, which is between 40° C. and 80° C., but can also be up to 120° C. or even 140° C., the first magnetic coercive field strength $Hcj_1$ is greater than the second magnetic coercive field strength $Hcj_2$ and the second remanence $Br_2$ is greater than the first remanence $Br_1$.

The magnetization direction of permanent magnets 32 of first set 36 is tangential, whereby permanent magnets 32 are arranged within first pockets 28 such that in each case the magnetic north and south poles of adjacent permanent magnets 32 are directed to one another. Permanent magnets 32 of second set 38, in contrast, are arranged and magnetized such that their particular north or south pole is directed to the respective opposite pole of permanent magnets 32 of first set 36. As a result, the south pole of one of permanent magnets 32 of second set 38, said south pole being arranged between two north poles of two permanent magnets 32 of first set 36, is directed to axis of rotation 4, whereas the north pole points in the direction of stator 8.

Figure 1B:
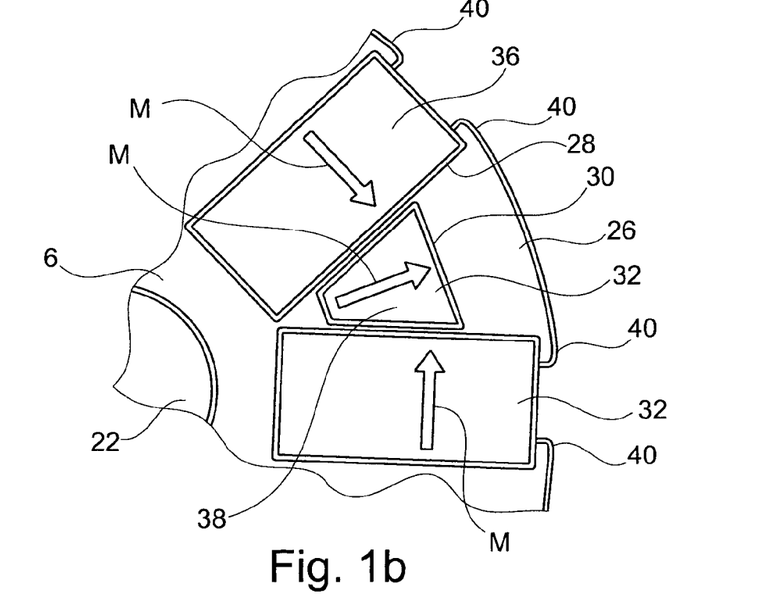
FIG. 1b shows an alternative embodiment in a detail.

An alternative embodiment in which core 24 is omitted is shown in a detail in FIG. 1b. Lamination stack 26 thus lies directly on shaft 24 and is secured there. First pockets 28 have projections 40 directed radially outward toward one another, which engage behind permanent magnets 32 of first set 36, which are disposed in the respective first pockets 28. Projections 40 thus prevent a separation due the centrifugal force caused by a rotational movement of rotor 6 during operation of electrical machine 2.

Further, the shape and position of both second pockets 30 and permanent magnets 32 of second set 38 are changed in comparison with the previous embodiment. These are shifted radially inwardly, on the one hand, which reduces demagnetization of permanent magnets 32 of second set 38 due to the magnetic field produced by electromagnet structure 6. On the other hand, the cross section of both is trapezoidal instead of rectangular, whereby their side flanks are parallel to the adjacent first pockets 28, to which second pockets 30 and permanent magnets 32 located therein have a relatively small distance. Because of this form, the mass of each permanent magnet 32 of second set 38 is increased, whereby the inertia of rotor 6 because of the inward shifting is not increased. A magnetization direction M of the particular permanent magnets 32 is indicated with the shown arrows. The magnetization direction M of permanent magnets 32 of second set 38 and their positioning reduce the strength of the magnetic field, produced by permanent magnet structure 34, within shaft 22, which increases further the efficiency and performance of electrical machine 2.

Figure 2A:
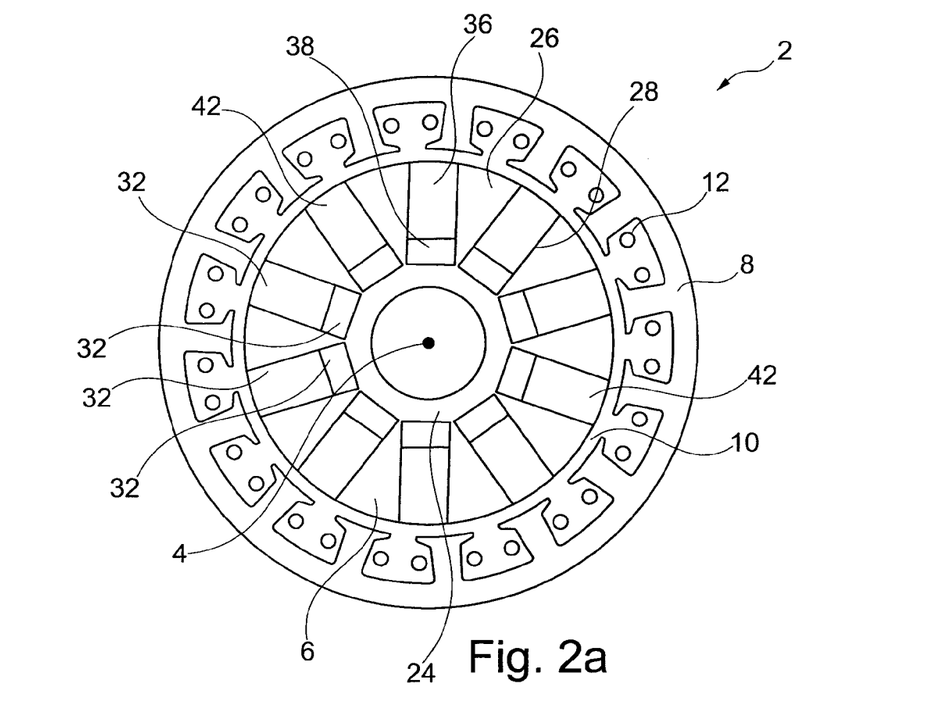
FIG. 2a shows in a sectional illustration a further embodiment of the electrical machine with a number of hybrid magnets.

A further alternative of electrical machine 2 perpendicular to axis of rotation 4 is shown in a sectional illustration in FIG. 2a, whereby stator 8 with electromagnet structure 12 corresponds substantially to that of the previous embodiments. Each permanent magnet 32 of first set 36 forms a hybrid magnet 42 with one of permanent magnets 32 of second set 38, whereby the respective permanent magnets 32 abut one another and the magnetization direction M of both permanent magnets 32 to one another and to their mutual contact surface is parallel.

Each hybrid magnet 42 is located in one each of the radial first pockets 28 of lamination stack 26 of rotor 6, in which there are no second pockets 30. In this case, hybrid magnets 42 are positioned such that their magnetization direction M is substantially tangential, so that in each case the same magnetic poles of two adjacent hybrid magnets 42 point toward one another. Furthermore, permanent magnets 32 of second set 38 are arranged inside. In other words, the distance of permanent magnets 32 of second set 38 to axis of rotation 4 is smaller than the corresponding distance of permanent magnets 32 of first set 36. Consequently, the distance of permanent magnets 32 of second set 38 to stator 8 having electromagnet structure 12 is greater than that of permanent magnets 32 of first set 36. In this way, permanent magnets 32 of second set 38 despite their relatively low second magnetic coercive field strength $Hcj_2$ are effectively protected from demagnetization by the magnetic field produced during the operation by electromagnet structure 12.

Figure 2B:
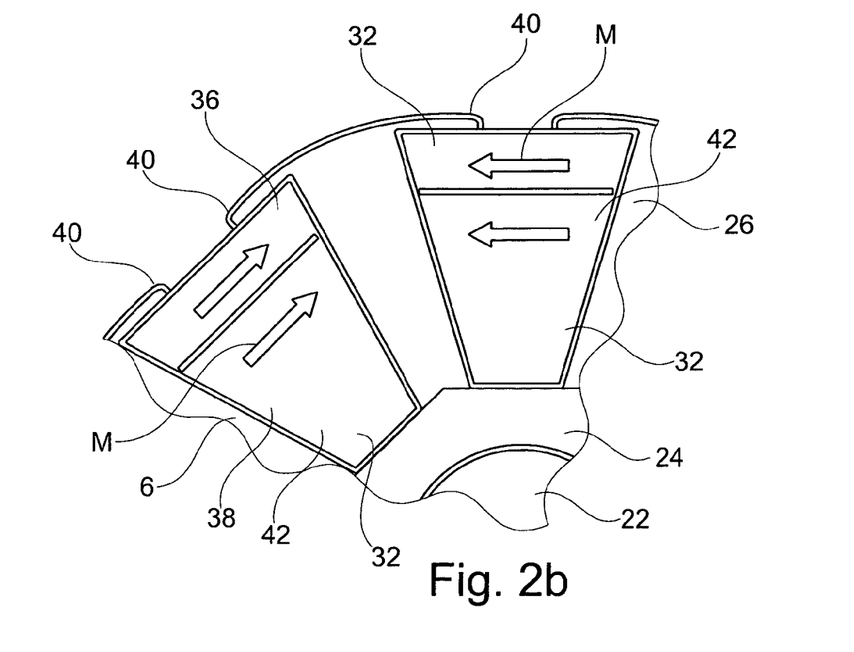
FIG. 2b shows an alternative embodiment in a detail.

A modified variant of rotor 6 of electrical machine 2 is illustrated in FIG. 2b. The magnetization direction M of permanent magnets 32 corresponds to that of the previous example. However, the cross section perpendicular to axis of rotation 4 of all permanent magnets 32 is changed from a rectangular to a trapezoidal shape, whereby permanent magnet 32 of first set 36 lies flush against permanent magnet 32 of second set 38 of each hybrid magnet 42. In this regard, the tangential extension of each hybrid magnet 42 increases with an increasing distance to axis of rotation 4. Because of the increased tangential width of permanent magnets 32 of first set 36, demagnetization of permanent magnets 32 of second set 38 is sufficiently prevented even at a relatively thin thickness of permanent magnets 32 of first set 36 in the radial direction. It is made possible for this reason to produce permanent magnet 32 of second set 38 with a relatively large thickness in the radial direction, which brings about a relatively strong magnetic field of permanent magnet structure 34.

Figure 2C:
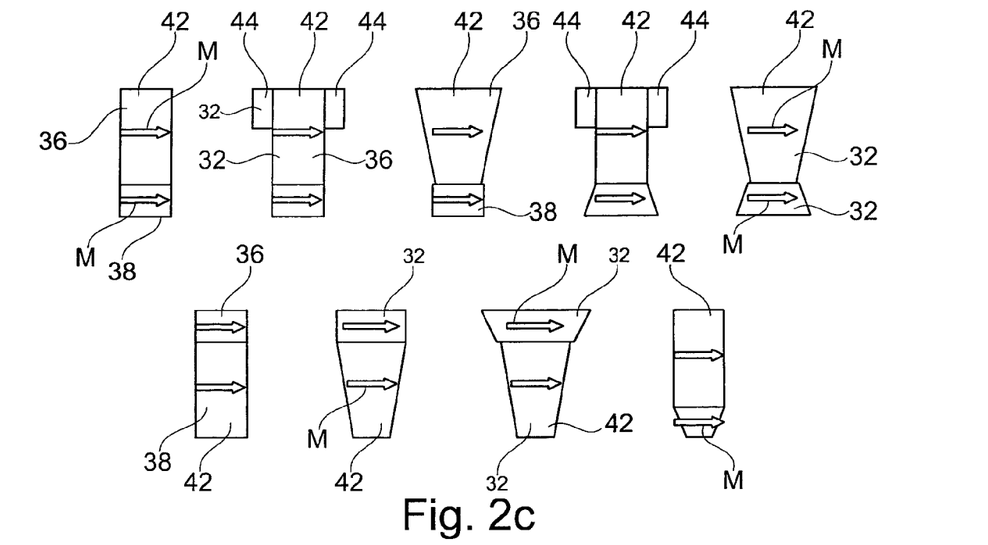
FIG. 2c shows alternative embodiments of the hybrid magnets.

FIG. 2c shows different embodiments of hybrid magnets 42, whereby the embodiments are numbered in rows from left to right. The magnetization direction M of hybrid magnets 42 is always from left to right, perpendicular to the radial direction, whereby axis of rotation 4 in the case of mounting on rotor 6 would be below the specific shown hybrid magnet 42. Permanent magnet 32 of first set 36 is shown above permanent magnet 32 of second set 38. Suitably, in the case of the electrical machine only one embodiment of hybrid magnet 42 each is used, but it is also possible to combine the different embodiments. The particular first pockets 28 for the arrangement of hybrid magnets 42 are designed accordingly to produce a form fit.

The first embodiment of hybrid magnet 42 corresponds to that shown in FIG. 2a. In the second embodiment, two permanent magnets 32 of a third set 44, whose magnetization direction M is parallel to that of permanent magnet 32 of first set 36, are connected tangentially at the radial free end of permanent magnet 32 of first set 36. Third set 44 has a third remanence $Br_3$ and a third magnetic coercive field strength $Hcj_3$. Third magnetic coercive field strength $Hcj_3$ is greater than first magnetic coercive field strength $Hcj_1$, which is reduced in comparison with the first embodiment, whereby for this reason the first remanence $Br_1$ is increased. Because the demagnetization caused by electromagnet structure 12 occurs primarily in the region of permanent magnets 32 of third set 44, nevertheless, hybrid magnets 42 are protected from demagnetization, whereby the magnetic field of hybrid magnet 42 is intensified.

In the third embodiment of hybrid magnet 42, the cross section of permanent magnet 32 of first set 36 is trapezoidal in comparison with the first exemplary embodiment, whereby the tangential width of permanent magnet 32 of first set 36 increases with the distance to permanent magnet 32 of second set 38, which protects it effectively from demagnetization. In the fourth embodiment, both permanent magnets 32 of first set 36 and third set 44 and also their arrangement correspond to those shown in the second embodiment. Because of the improved shielding of permanent magnet 32 of second set 38, it is widened at its free end without the fear of demagnetization. Because of the widening, more magnetic material is available and the magnetic field of hybrid magnet 42 is greater than that of the second embodiment.

In the fifth embodiment, permanent magnet 32 of first set 36 corresponds to that in the third embodiment and permanent magnet 32 of second set 38 to permanent magnet 32 shown in the fourth embodiment, whereby their particular advantages apply to this hybrid magnet 42 as well. The sixth embodiment of hybrid magnet 42 differs from the first in the different extension of permanent magnets 32 in the radial direction. Thus, the volume of permanent magnet 32 of first set 36 is reduced and that of permanent magnet 32 of second set 38 increased. In order to enable reliable operation, the second magnetic coercive field strength $Hcj_2$ is increased by adding heavy rare earth elements to the material of second set 38.

In the seventh embodiment, permanent magnet 32 of second set 38 is narrowed in the direction of axis of rotation 4 to counteract demagnetization in its edge region. Because of the shape, it is possible in the case of this permanent magnet 32 to also use a material with a relatively low second magnetic coercive field strength $Hcj_2$. In the eighth embodiment, moreover, permanent magnet 32 of first set 36 is increased to prevent demagnetization of permanent magnet 32 of second set 38 in the case of a further reduced second magnetic coercive field strength $Hcj_2$. In the last embodiment, in comparison with the first embodiment, the cross section of permanent magnet 32 of second set 38 is narrowed in the direction of axis of rotation 4, as is also the case in the seventh embodiment.

Figure 3A:
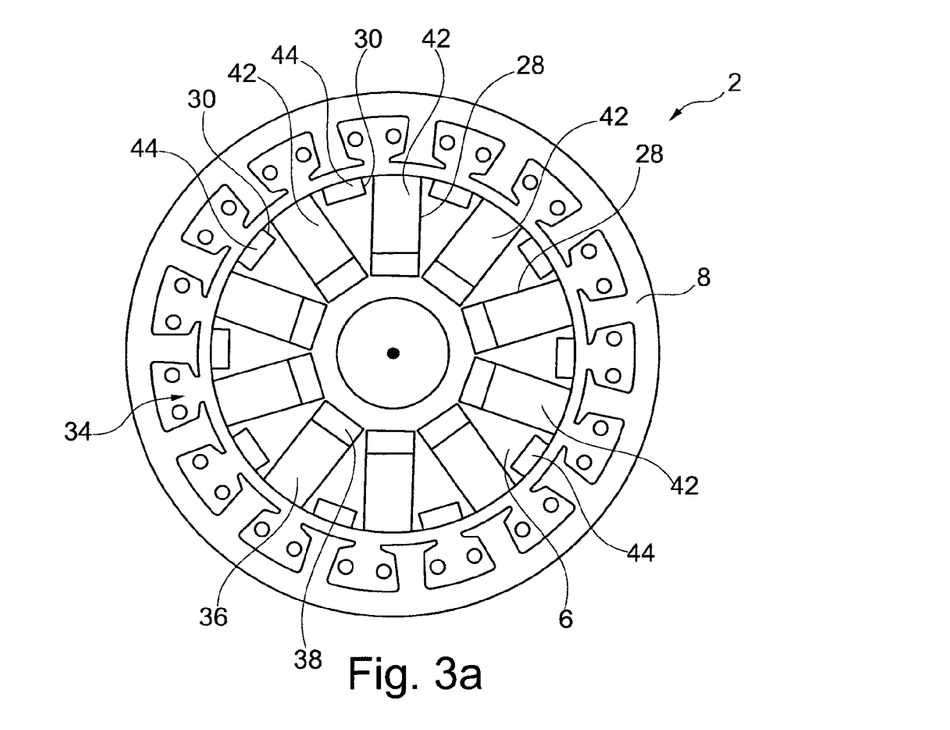

A modified embodiment of electrical machine 2 according to FIG. 1a is shown in FIG. 3a, whereby stator 8 is the same. Rotor 6 with the exception of permanent magnet structure 34 also corresponds to the embodiment shown in FIG. 1a. However, hybrid magnets 42 are arranged in first pockets 28 according to electrical machine 2 shown in FIG. 2a. There are permanent magnets 32 of third set 44 in second pockets 30, whereby their arrangement and orientation correspond to those of permanent magnets 32 of second set 38, as shown in FIG. 1a. The third magnetic coercive field strength $Hcj_3$ is smaller than the second magnetic coercive field strength $Hcj_2$ and the third remanence $Br_3$ is greater than the second remanence $Br_2$.

Figure 3B:
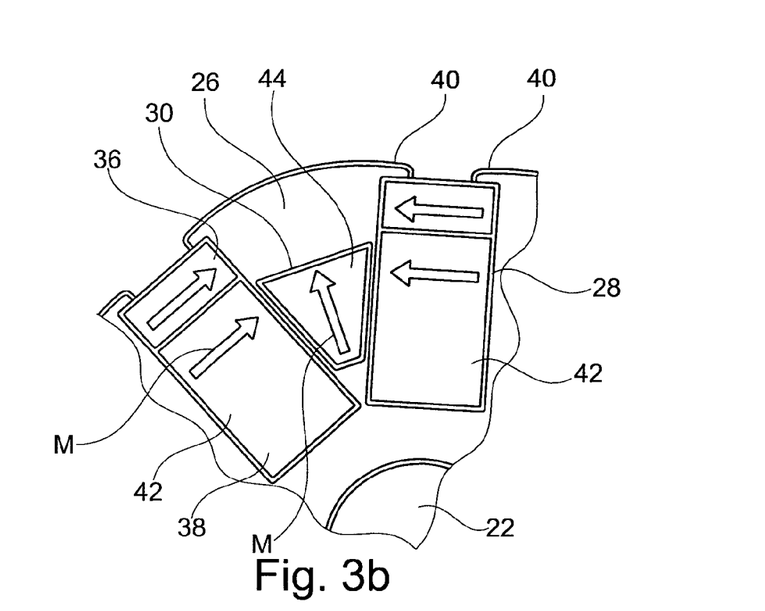
FIG. 3b shows an alternative embodiment according to FIG. 2b.

FIG. 3b shows a modified form. Hybrid magnets 42 are designed according to the sixth embodiment shown in FIG. 2c and second pockets 30 according to second pockets 30 shown in FIG. 1b. In this case, permanent magnets 32 of third set 44 are again arranged form-fittingly in second pockets 30 and radially magnetized. The third remanence $Br_3$ is the largest of the three remanences $Br_2$, $Br_a$ and the third magnetic coercive field strength $Hcj_3$ the smallest of the three magnetic coercive field strengths $Hcj_1$, $Hcj_2$, $Hcj_3$.

Figure 3C:
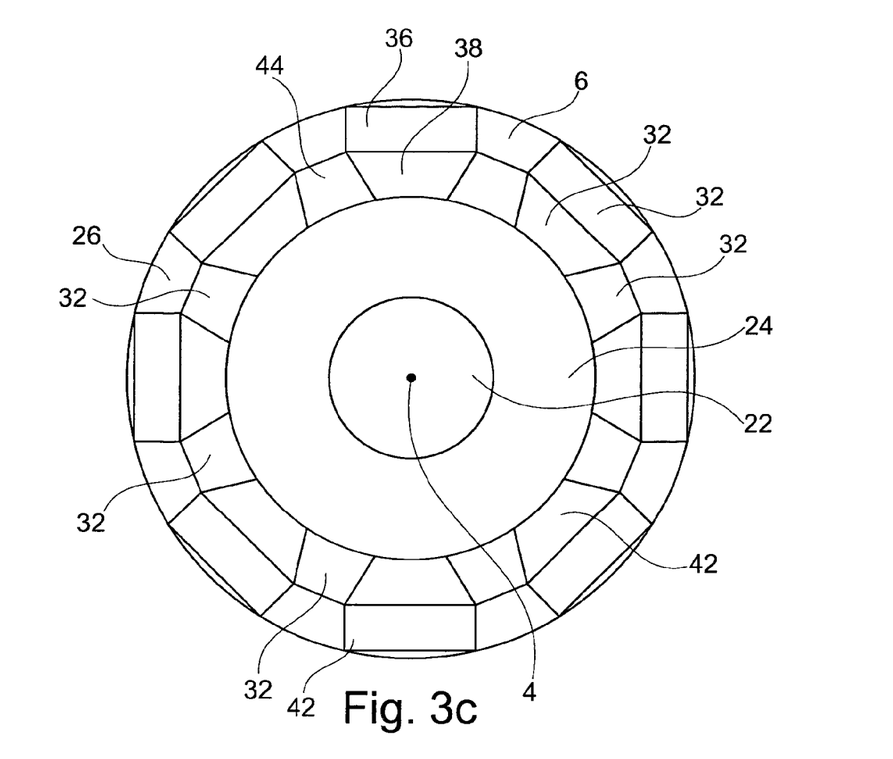

An alternative of rotor 6, which is free of heavy rare earth elements, is shown in FIG. 3c. The radial thickness of all permanent magnets 32 is substantially the same. The cross section of permanent magnets 32 of first set 36 is rectangular and that of second set 38 trapezoidal, so that the shape of the formed hybrid magnets 42 corresponds substantially to the seventh embodiment of FIG. 2c with different thicknesses. Permanent magnets 32 of third set 44, whose magnetization direction M runs substantially radially, are positioned between permanent magnets 32 of second set 38. In this case, the cross section of permanent magnets 32 of third set 44 is also trapezoidal, whereby the cross section narrows with increasing distance to axis of rotation 4. The flanks of permanent magnets 32 of the second and third set 38, 44 thus do not run radially. All permanent magnets 32, which are in direct mechanical contact with their respective adjacent permanent magnets 32, are surrounded radially outward by lamination stack 26. Permanent magnets 32 are separated radially inward from shaft 22 by nonmagnetic core 24.

Figure 4:
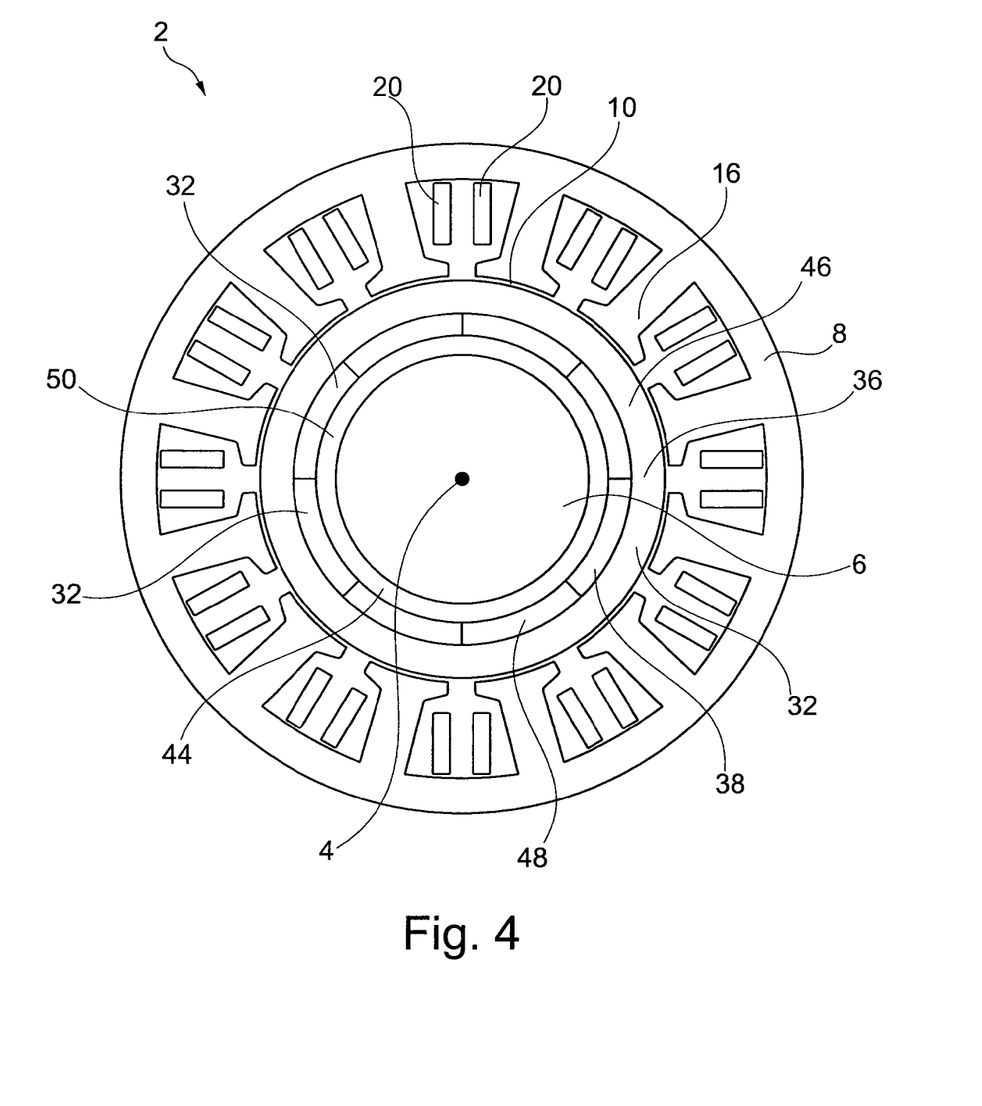

A further embodiment of electrical machine 2 is shown in FIG. 4, in which stator 8 is also altered. It has 12 teeth 16 and 12 coils 20. Rotor 6 comprises an outer first ring 46, which is produced from first set 36. First ring 46 is made as one piece; therefore it is a single permanent magnet 32 and includes a sintered ferrite. A second ring 48, which has eight permanent magnets 32 of second set 38, is arranged within first ring 46. The cross section of each permanent magnet 32 of second set 38 corresponds to a circular arc segment of 45°. A third ring 50, which is made corresponding to first ring 46, is located within second ring 48 but with a reduced diameter, whereby third ring 50 has third set 44. The material of third set 44 is also a sintered ferrite. In principle, it is also possible to produce all rings 46, 48 50 as one piece or from circular arc segments, also with a different angle.

The individual rings 46, 48, 50 are concentric to one another and in direct mechanical contact. The first and third ring 46, 50 thus stabilize the individual permanent magnets 32 of second ring 48, which lies form-fittingly between the two rings 46, 50. Because of the shielding of second ring 48 by first ring 46 including a ferrite, corrosion of second ring 48 due to a chemical reaction with the oxygen in air gap 10 is ruled out. In the production of electrical machine 2, the composite of rings 46, 48, 50 is prefabricated, and placed on core 24 (not shown in greater detail) and on shaft 22. The ring composite thus forms the radially outer boundary of rotor 6.

The magnetization direction M of each permanent magnet 32 of second set 38 is radially directed, whereby the orientation of the magnetization direction M of permanent magnets 32, adjacent to one another, of second set 38 differs. The regions of first and third ring 46, 50 radially abutting permanent magnets 32 of second set 38, are radially magnetized according to the particular permanent magnet 32 of second set 38. Consequently, the magnetization direction of the complete ring composite is also radial, where the polarity changes every 45°. Electrical machine 2 thus has eight magnetic poles.

The invention is not limited to the exemplary embodiments described above. Rather, other variants of the invention can also be derived herefrom by the person skilled in the art, without going beyond the subject matter of the invention. Particularly, all individual features described in relation to the exemplary embodiments can furthermore be combined with one another in a different manner, without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrical machine comprising:
   a stator;
   a rotor with an axis of rotation, the stator and rotor each have an electromagnet structure or a permanent magnet structure, the permanent magnet structure comprising a first set of permanent magnets and a second set of permanent magnets, wherein at at least the operating temperature, a magnetic coercive field strength of the first set is greater than a magnetic coercive field strength of the second set, and
   wherein at at least the operating temperature, a remanence of the second set is greater than a remanence of the first set.

2. The electrical machine according to claim 1, wherein a distance of the permanent magnets of the first set to the stator or rotor having the electromagnet structure is smaller than a distance of the permanent magnets of the second set.

3. The electrical machine according to claim 2, wherein, in each case, a permanent magnet of the first set and a permanent magnet of the second set are combined to form a hybrid magnet, whose orientation is radial with respect to the axis of rotation.

4. The electrical machine according to claim 3, wherein a magnetization direction of the two permanent magnets of each hybrid magnet is parallel to one another, and/or wherein the two permanent magnets are in direct mechanical contact.

5. The electrical machine according to claim 3, wherein a cross section of the permanent magnets of the first and/or second set with respect to the axis of rotation is rectangular or trapezoidal.

6. The electrical machine according to claim 5, further comprising at least two trapezoidal permanent magnets, wherein, between the at least two trapezoidal permanent magnets, a particularly corresponding number of permanent magnets of a third set is arranged, whose magnetic coercive field strength and/or remanence is different from those of the first and second set.

7. The electrical machine according to claim 3, wherein the hybrid magnet is arranged in a pocket of a lamination stack.

8. The electrical machine according to claim 2, wherein the permanent magnet structure has a first ring and a second ring, and wherein the first ring is formed from the first set and the second ring from the second set.

9. The electrical machine according to claim 8, wherein the first ring and the second ring are in direct mechanical contact.

10. The electrical machine according to claim 8, wherein an air gap between the rotor and the stator is bounded by the first ring.

11. The electrical machine according to claim 8, wherein the permanent magnet structure has a third ring, which is arranged on a side, opposite to the first ring, of the second ring, and wherein the magnetic coercive field strength and/or remanence of the third ring are different from those of the first and second ring.

12. The electrical machine according to claim 8, wherein the rings have 8-10 magnetic poles, and wherein the magnetic poles of the rings are each arranged radially to one another.

13. The electrical machine according to claim 1, wherein the first set has a sintered ferrite, SmCo, (NdDy)FeB, and/or the second set has a light rare earth element alloy, particularly NdFeB.

14. The electrical machine according to claim 1, wherein the electrical machine is an electric motor of a motor vehicle.

15. The electrical machine according to claim 1, wherein the permanent magnets of the second set are formed of NdFeB.

16. The electrical machine according to claim 1, wherein the permanent magnets of the second set are formed of a light rare element alloy.

17. The electrical machine according to claim 1, further comprising a third set of permanent magnets, the permanent magnets of the third set directly contacting the permanent magnets of the first set.

* * * * *